US012674748B2

(12) United States Patent
Klymchenko et al.

(10) Patent No.: US 12,674,748 B2
(45) Date of Patent: Jul. 7, 2026

(54) CALIBRATION AID FOR OPTICAL IMAGING APPLICATIONS

(71) Applicants: UNIVERSITE DE STRASBOURG, Strasbourg (FR); CENTRE NATIONAL DE LA RECHERCHE SCIENTIFIQUE, Paris (FR); INSTITUT DE RECHERCHE CONTRE LES CANCERS DE L'APPAREIL DIGESTIF (IRCAD), Strasbourg Cedex (FR)

(72) Inventors: Andrey Klymchenko, Illkirch-Graffenstaden (FR); Michèle Diana, Saverne (FR); Anila Hoskere Ashoka, Illkirch-Graffenstaden (FR)

(73) Assignees: UNIVERSITE DE STRASBOURG, Strasbourg (FR); CENTRE NATIONAL DE LA RECHERCHE SCIENTIFIQUE, Paris (FR); INSTITUT DE RECHERCHE CONTRE LES CANCERS DE L'APPAREIL DIGESTIF (IRCAD), Strasbourg (FR)

( * ) Notice: Subject to any disclaimer, the term of this patent is extended or adjusted under 35 U.S.C. 154(b) by 150 days.

(21) Appl. No.: 18/689,936

(22) PCT Filed: Sep. 21, 2022

(86) PCT No.: PCT/EP2022/076183
§ 371 (c)(1),
(2) Date: Mar. 7, 2024

(87) PCT Pub. No.: WO2023/046729
PCT Pub. Date: Mar. 30, 2023

(65) Prior Publication Data

US 2024/0369474 A1 Nov. 7, 2024

(30) Foreign Application Priority Data

Sep. 22, 2021 (EP) .................................... 21306309

(51) Int. Cl.
*C09B 23/04* (2006.01)
*C09K 11/06* (2006.01)
(Continued)

(52) U.S. Cl.
CPC ........... *G01N 21/274* (2013.01); *C09B 23/04* (2013.01); *C09K 11/06* (2013.01); *G01N 21/643* (2013.01); *C09K 2211/1044* (2013.01)

(58) Field of Classification Search
CPC .... G01N 21/274; G01N 21/643; C09B 23/04; C09K 11/06; C09K 2211/1044
See application file for complete search history.

(56) References Cited

U.S. PATENT DOCUMENTS 5,308,825 A 5/1994 Defieuw
5,436,217 A 7/1995 Van Steen et al.
(Continued)

FOREIGN PATENT DOCUMENTS

JP 2018120184 A 8/2018
WO 95/26061 A1 9/1995

OTHER PUBLICATIONS

International Search Report and Written Opinion received for PCT/EP2022/076183, mailed Jan. 16, 2023.
(Continued)

*Primary Examiner* — Uzma Alam
*Assistant Examiner* — Fani Polyzos Boosalis
(74) *Attorney, Agent, or Firm* — Greer, Burns & Crain, Ltd

(57) ABSTRACT

A calibration device for optical imaging applications, including a body forming separate areas and a material
(Continued)

formed on the areas, the material includes at least one polymeric material and at least one dye visible in a spectral range of wave-lengths including between 500 nm and 2000 nm included arranged on the areas, the at least one polymer forms a continued matrix, the at least one dye is homogeneously distributed within the polymer matrix, in a predetermined weight percentage by weight of the hydrophobic polymer in the material, and the weight percentage of said at least one dye is different in each of the areas.

15 Claims, 3 Drawing Sheets

(51) Int. Cl.

*G01N 21/27* (2006.01)
*G01N 21/64* (2006.01)

(56) References Cited

U.S. PATENT DOCUMENTS 10,383,957 B2 * 8/2019 de Haas ............. A61K 49/0091
2006/0199088 A1 9/2006 McCollough et al.
2021/0120193 A1 * 4/2021 Swager .............. G01N 21/6428

OTHER PUBLICATIONS

European Search Report received for Application No. 21306309.2, dated Feb. 24, 2022.
Notice of Reasons for Refusal received in Japanese Application No. 2024-518282, dated Mar. 16, 2026.

* cited by examiner

CALIBRATION AID FOR OPTICAL IMAGING APPLICATIONS

BACKGROUND

The present invention relates generally to optical imaging applications and systems.

More specifically, the present invention refers to a calibration device, also called “calibration aid”, for such applications.

In optical imaging applications, for instance surgical procedures using optical imaging device, a calibration aid is used to calibrate the device. Typically, the calibration aid comprises a fluorescent dye with an absorption in the near infrared range.

Conventional optical dye may result in low stability of coating leading to leakage of the dye to tissue, low brightness and fast chemical and photo-chemical degradation (bleaching).

In the context of optical imaging applications, there is a genuine need to provide improved calibration device and corresponding methods.

SUMMARY

The first object of the present invention is a calibration device for optical imaging applications, comprising a body forming at least two separate areas and a material arranged on said areas, wherein:

- said material comprises at least one hydrophobic polymer, and at least one dye visible in a spectral range of wave-lengths comprised between 500 nm and 2000 nm included,
- said at least one hydrophobic polymer forms a continuous matrix,
- said at least one dye is homogeneously distributed within said polymer matrix, in a predetermined weight percentage by weight of the hydrophobic polymer in said material,
- the weight percentage of said at least one dye is different in each of said areas.

Said areas, or spots, can be concave, convex or plane.

In an embodiment, the body comprises at least two recesses respectively forming said at least two separate areas.

In an embodiment, the body comprises a planar surface defining said areas.

Said optical imaging applications can be surgical optical imaging applications.

According to a particular embodiment of the present invention, said material is in the form of a coating, for example in the form of coating films. The term “coating film”, as used herein, refers to a single layered or multiple-layered dried thin layer(s) formed after applying a solution of a polymer comprising at least one dye visible in a spectral range of wavelengths comprised between 500 nm and 2000 nm included as defined before.

Said coating films are homogeneous, stable, and have a good adhesion on a smooth surface.

According to the invention, the material arranged on said areas is a solid polymer matrix enclosing said dye. This embodiment allows the calibration device to be easily sterilisable, for example by contact with a sterilising composition.

According to a particularly advantageous embodiment, said hydrophobic polymer is chosen from poly(methyl methacrylate), poly(ethyl methacrylate), poly(propyl methacrylate), poly(butyl methacrylate), poly(methyl methacrylate-co-methacrylic acid), poly(lactide-co-glycolide), polylactic acid, polyglycolic acid, polycaprolacton, cellulose triacetate, nitrocellulose, polydimethylsiloxane, poly(ethylene terephthalate), polycarbonate, polyethylene, ethylene vinyl acetate copolymer, polyurethane, polystyrene, and copolymers thereof with poly(ethylene glycol).

In a preferred embodiment, the material is a luminescent material.

More specifically, said at least one dye may be chosen among luminescent dyes, including fluorescent dyes, phosphorescent dyes and chemiluminescent dyes.

Preferably the at least one dye is visible by a light having a wavelength of from 500 nm to 1300 nm, and even more preferably of from 700 nm to 900 nm included.

According to a particular and preferred embodiment of the present invention, said at least one dye is chosen in the group comprising:

i) cyanine dyes of the following formula (I) below:

(I)

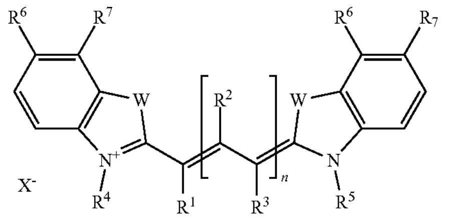

wherein:

- n is an integer equal to 1, 2, 3 or 4;
- $X^-$ is a counterion,
- W is a heteroatom selected from the group comprising S, N and O or a carbon atom bearing two methyl substituents ($C(CH_3)_2$);
- $R^1$, $R^2$ and $R^3$, which may be identical or different, represent a hydrogen atom, a hydrocarbon chain having from 1 to 24 carbon atoms;
- $R^4$ and $R^5$, which may be identical or different, represent a hydrogen atom or an hydrocarbon chain having from 1 to 24 carbon atoms;
- $R^6$ and $R^7$ are identical and represent a hydrogen atom, or form together and with the carbon atoms to which they are respectively bonded, a fused benzene ring.

ii) a dye of following formula (II) below:

(II)

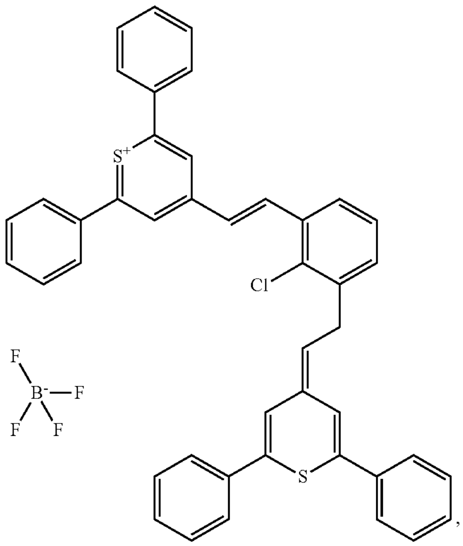, and iii) dyes of following formula (III) below:

(III)

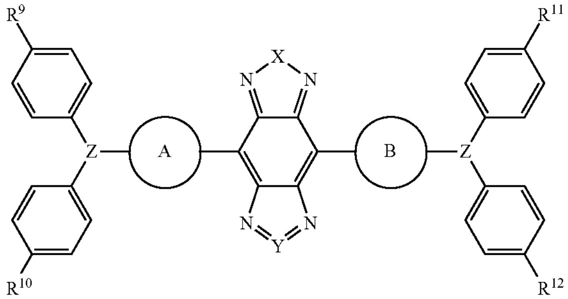

wherein:

A and B are independently selected from the group consisting of:

, 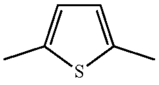 and

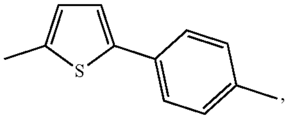,

X and Y are each independently selected from the group consisting of S and Se,

Z is independently one of N and P; and $R^9$, $R^{10}$, $R^{11}$ and $R^{12}$ are each independently of the formula -alkyl-linker wherein "alkyl" is $-(CH_2)_n-$, further wherein n is between 1 and 14, inclusive, and further wherein "linker" is selected form the group consisting of sulfonic, phosphonic, carboxyl, hydroxyl, NETS-ester, maleimide, amine, —SH, sulfonic acid and hydrazide.

In a particular and preferred embodiment of the invention, said at least one dye of formula (I) is a fluorescent dye and is a 5.5, cyanine of following formula:

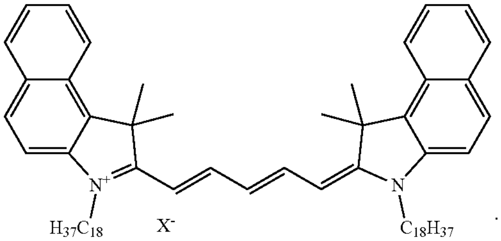.

Said at least one dye can also be a fluorescent dye chosen among 7.5 cyanines of following formula (IV):

(IV)

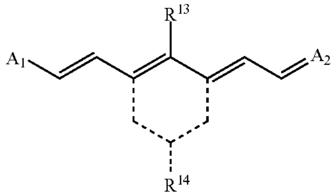

wherein:

$R^{13}$ and $R^{14}$ are the same or different and independently selected from a group consisting of:

an hydrogen, a group chosen from a $(C_1-C_{20})$alkyl, a cyclo$(C_3-C_{20})$alkyl, a $(C_2-C_{20})$alkenyl, a $(C_2-C_{20})$alkynyl, a heterocyclic group, a cyclo$(C_3-C_{20})$alkenyl, a heterocyclo$(C_2-C_{20})$alkenyl, an aryl, a heteroaryl, a hetero$(C_1-C_{20})$alkyl, a $(C_1-C_{20})$alkylaryl, and a $(C_1-C_{20})$alkylheteroaryl, said group being unsubstituted or substituted by one or two substituents chosen from a $(C_1-C_5)$alkyl, an aryl, and $-COOR_{11}$, $R_{11}$ being a $(C_1-C_{20})$alkyl, and a group of formula $\leftarrow$E-$R^{15}$, wherein E is chosen from —O—, —S—, —Se—, —NH—, $-CH_2-$; $R^{15}$ is chosen from a $(C_1-C_{20})$alkyl, a cyclo$(C_3-C_{20})$alkyl, a $(C_2-C_{20})$alkenyl, a $(C_2-C_{20})$alkynyl, a heterocyclic group, a cyclo$(C_3-C_{20})$alkenyl, a heterocyclo$(C_2-C_{20})$alkenyl, an aryl, a heteroaryl, a hetero$(C_1-C_{20})$alkyl, a $(C_1-C_{20})$alkylaryl, a $(C_1-C_{20})$alkylheteroaryl, $R^{15}$ being unsubstituted or substituted by one to three substituents chosen from a $(C_1-C_5)$alkyl, an aryl, or $-COOR^{16}$, $R^{16}$ being a $(C_1-C_{20})$alkyl, $A_1$ is a group of following formula:

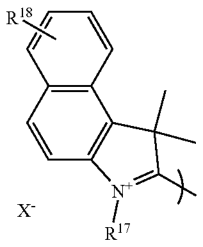

and $A_2$ is a group of following formula:

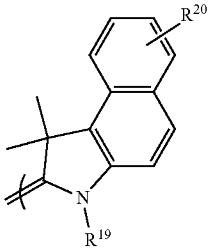

or $A_1$ is a group of following formula:

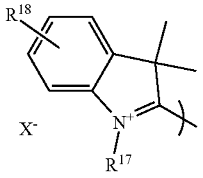

and $A_2$ is a group of following formula:

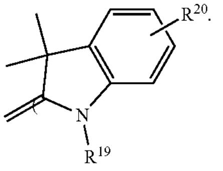

wherein:

$R^{18}$ and $R^{20}$ are independently selected from the group consisting of hydrogen, halogen, $(C_1\text{-}C_{10})$alkyl, —$OR^{21}$, —$NR^{21}R^{22}$, —$NO_2$, —$CF_3$, —CN, —$SR^{21}$, —$N_3$, —C(═O) $R^{21}$, —OC(═)$OR^{21}$, —C(═O)$NR^{21}R^{22}$, —$NR^{21}$C(═O)$R^{22}$, wherein $R^{21}$ and $R^{22}$ are independently selected from hydrogen, unsubstituted $(C_1\text{-}C_{10})$alkyl, unsubstituted $(C_2\text{-}C_{10})$alkenyl, unsubstituted $(C_2\text{-}C_{10})$alkynyl, cyclo$(C_3\text{-}C_{10})$alkyl, heterocyclic group, cyclo$(C_3\text{-}C_{10})$alkenyl, heterocyclo$(C_2\text{-}C_{10})$alkenyl, aryl, heteroaryl, aryl$(C_1\text{-}C_{10})$alkyl, hetero$(C_1\text{-}C_{10})$alkyl, $(C_1\text{-}C_{10})$alkylaryl, $(C_1\text{-}C_{10})$alkylheteroaryl;

$R^{17}$ and $R^{19}$ are independently selected from the group consisting of a $(C_1\text{-}C_{20})$alkyl eventually substituted by a hydrophobic group, a cyclo$(C_3\text{-}C_{20})$alkyl eventually substituted by a hydrophobic group, a $(C_2\text{-}C_{20})$alkenyl eventually substituted by a hydrophobic group, a $(C_2\text{-}C_{20})$alkynyl, a heterocyclic group eventually substituted by a hydrophobic group, a cyclo$(C_3\text{-}C_{20})$alkenyl eventually substituted by a hydrophobic group, a heterocyclo$(C_2\text{-}C_{20})$alkenyl eventually substituted by a hydrophobic group, an aryl eventually substituted by a hydrophobic group, a heteroaryl eventually substituted by a hydrophobic group, a hetero$(C_1\text{-}C_{20})$alkyl eventually substituted by a hydrophobic group, a $(C_1\text{-}C_{20})$alkylaryl eventually substituted by a hydrophobic group, a $(C_1\text{-}C_{20})$alkylheteroaryl eventually substituted by a hydrophobic group, said hydrophobic group being selected from methyl, ethyl, methoxy, ethyloxy;

$X^-$ is a counterion, and their analogues.

Among said dyes of formula (IV), one can in particular mention dyes of formula (IVa) below:

(IVa)

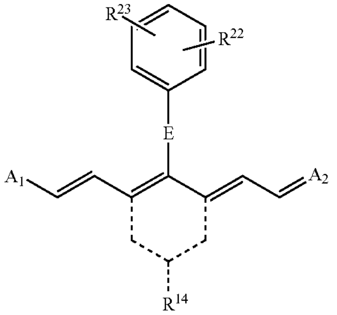

wherein:

A1, A2, $R^{14}$, and E are as defined before;

$R^{22}$ and $R^{23}$ are the same or different and independently selected from a hydrogen atom, an aryl, a $(C_1\text{-}C_5)$ alkyl, or —$COOR^{24}$, $R^{24}$ being a $(C_1\text{-}C_{20})$alkyl.

In a more particular embodiment of the invention, the fluorescent dye is represented by the formula (Iva1) below:

(IVa1)

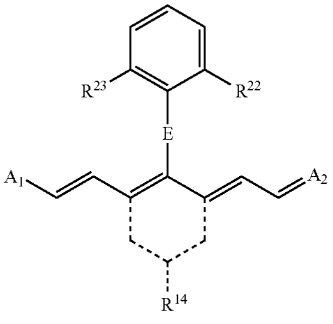

wherein:

A1, A2, $R^{14}$, and E are as defined before;

$R^{22}$ and $R^{23}$ are the same or different and independently selected from an aryl;

The presence of counterions may contribute to decrease aggregation and self-quenching of optically active dyes, and in particular of fluorescent dyes in the material of the invention.

With regard to the present invention, the counterion may be chosen from:

an inorganic counterion, an organic counterion, or a bulky organic counterion chosen from tetraphenylborate, tetrakis(pentafluorophenyl)borate, tetrakis(4-fluorophenyl)borate, tetraphenylborate, tetrakis[3,5-bis-(trifluoromethyl)phenyl]borate, tetrakis[3,5-bis-(1,1,1,3,3,3-hexafluoro-2-methoxy-2-propyl)phenyl]borate and tetrakis[perfluoro-tert-butoxy]aluminate.

The term "bulky organic counterion" as used herein means a large organic anion bearing aromatic and/or aliphatic residues.

Examples of inorganic counterion may include, without limitation, chloride, perchlorate, sulfonate, nitrate, tetrafluoroborate and hexafluorophosphate.

Examples of organic counterion may include, without limitation, acetate, formate, propionate, anions of fatty acids, benzoate and tosylate.

In the present description the term "alkyl", alone or in combination, refers to a branched or unbranched saturated hydrocarbon group having the indicated number of carbon atoms. As used herein, the term "(Cx-Cy)alkyl", wherein x and y respectively being a different positive integer, is meant to an alkyl group having from x to y number of carbon atoms. For example, the terms "($C_1$-$C_{20}$)alkyl", "($C_1$-$C_{10}$)alkyl", "($C_8$-$C_{20}$)alkyl", "($C_{12}$-$C_{18}$)alkyl" as used herein respectively refer to an alkyl group having from 1 to 20 carbon atoms, from 1 to 10 carbon atoms, from 8 to 20 carbon atoms or from 12 to 18 carbon atoms.

Examples of alkyl can be, but not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, n-undecyl, n-docenyl, n-tridecyl, n-tetradecyl, n-pentadecyl, n-hexadecyl, n-heptadecyl, n-octadecyl, n-nonadecyl and n-icosyl.

The terms "hetero($C_1$-$C_{10}$)alkyl", "hetero($C_1$-$C_{20}$)alkyl", and "hetero($C_8$-$C_{20}$)alkyl" respectively refer to a ($C_1$-$C_{10}$)alkyl group, a ($C_1$-$C_{20}$)alkyl group or a ($C_8$-$C_{20}$)alkyl group as defined before in which one or more carbon atoms are replaced by an oxygen, nitrogen, phosphorus or sulfur.

Examples of a heteroalkyl can be an alkyloxy (methoxy, ethoxy, etc), alkylmercapto (methylmercapto, ethylmercapto, etc), or an alkyloxyethyl (methoxyethyl, etc), etc.

The term "cycloalkyl" refers to a cyclic saturated carbon-based ring composed of at least three carbon atoms. The terms "cyclo(3-20)alkyl", "cyclo(3-10)alkyl" or "cyclo(8-20)alkyl" respectively refer to an cycloalkyl composed of from 3 to 20 carbon atoms, from 3 to 10 carbon atoms, or from 8 to 20 carbon atoms.

Examples of cycloalkyl groups include, but are not limited to, cyclopropyl, cyclobutyl, cyclopentyl, cyclohexyl, cycloheptyl, cyclooctyl, cyclononyl, cyclodecyl, cyclotetradecyl, cyclohexadecyl, cycloheptadecyl, cyclooctadecyl, cyclononadecyl and cycloicosyl.

The term "alkenyl" as used herein, alone or in combination, refers to a branched or unbranched hydrocarbon group of the indicated number of carbon atoms having at least one carbon-carbon double bond. The terms "($C_2$-$C_{20}$)alkenyl", "($C_2$-$C_{10}$)alkenyl" or "($C_8$-$C_{20}$)alkenyl" signify respectively an alkenyl group of 2 to 20 atoms, an alkenyl group of 2 to 10 carbon atoms or an alkenyl group of 8 to 20 carbon atoms.

Examples of alkenyl group are ethenyl, 1-propenyl, 2-propenyl, isopropenyl, 1-butenyl, 2-butenyl, 3-butenyl, isobutenyl, 1-pentenyl, 1-hexenyl, 1-heptenyl, 1-octenyl, 1-nonenyl, 2-nonenyl, 1-decenyl, 1-undecenyl, 1-dodecenyl, 1-tridecenyl, 1-tetradecenyl, 1-pentadecenyl, 1-hexadecenyl, 1-heptadecenyl, 1-octadecenyl, 1-nonadecenyl, 1-eicosenyl, 1,3-butadienyl and 1,4-pentadienyl.

The term "cycloalkenyl" refers to a cyclic unsaturated carbon-based ring composed of at least 3 carbon atoms and containing at least one carbon-carbon double bond. The terms "cyclo(3-20)alkenyl", "cyclo(3-10)alkenyl" and "cyclo(8-20)alkenyl" signify respectively a cycloalkenyl having 3-20 carbon atoms, a cycloalkenyl having 3-10 carbon atoms or a cyclocalkenyl having 8-20 carbon atoms.

Examples of cycloalkenyl groups include, but are not limited to, cyclopropenyl, cyclobutenyl, cyclopentenyl, cyclopentadienyl, cyclohexenyl, cyclohexadienyl, cycloheptenyl, cyclooctenyl, and the like.

The terms "heterocycloalkenyl" as used herein refers to a heterocyclic unsaturated carbon-based ring comprising at least two carbon atoms and at least one heteroatom chosen from oxygen, nitrogen, phosphorus or sulfur. The terms "heterocyclo($C_2$-$C_{20}$)alkenyl", "heterocyclo($C_2$-$C_{10}$)alkenyl" and "heterocyclo($C_8$-$C_{20}$)alkenyl" respectively refer to a heterocycloalkenyl having 2-20 carbon atoms, having 2-10 carbon atoms, or having 8-20 carbon atoms.

The term "alkynyl" as used herein, alone or in combination, means a branched or unbranched hydrocarbon group of the indicated number of atoms comprising at least a triple bond between two carbon atoms. The terms "($C_2$-$C_{20}$)alkynyl", "($C_2$-$C_{10}$)alkynyl", or "($C_8$-$C_{20}$)alkynyl respectively signify an alkynyl group having 2 to 20 carbon atoms, 2 to 10 carbon atoms, or 8 to 20 carbon atoms. Examples of alkynyl groups include ethynyl, propynyl, butynyl, octynyl, etc.

The term "aryl" as employed herein alone or as part of another group refers to monocyclic and bicyclic aromatic groups containing 6 to 10 carbons in the ring portion. Examples of aryl include phenyl and naphthyl.

The term "($C_1$-$C_{20}$)alkylaryl" and "($C_1$-$C_{10}$)alkylaryl" respectively refer to an aryl group as defined being substituted by a ($C_1$-$C_{20}$)alkyl group or a ($C_1$-$C_{10}$)alkyl group.

The term "heteroaryl" refers to an aryl group, in which one or more carbon atoms are replaced by an oxygen, a nitrogen, a phosphorus or a sulfur, for example the 4-pyridyl, 2-imidazolyl, 3-pyrazolyl and isochinolinyl group.

The term "aryl($C_1$-$C_{10}$)alkyl" refers to a ($C_1$-$C_{10}$)alkyl as defined before being substituted by an aryl.

The terms "($C_1$-$C_{20}$)alkylheteroaryl" and "($C_1$-$C_{10}$)alkylheteroaryl" respectively mean a heteroaryl group as defined before being substituted by a ($C_1$-$C_{20}$)alkyl group or a ($C_1$-$C_{10}$)alkyl group.

The term "heterocyclic group" refers to a carbocyclic group, in which one or more carbon atoms are replaced by an oxygen, a nitrogen, a phosphorus, or a sulfur atom. A heterocyclic group can be a heteroaryl, a heterocycloalkyl, a heterocycloalkenyl, etc. Examples of heterocyclic group include furyl, pyrrolyl, imidazolyl, thiazolyl, isothiazolyl, pyrrolidinyl, pyridyl, quinolyl, pyrimidinyl.

The term "halogen" means fluorine, chlorine, bromine or iodine.

Preferably, the weight percentage of the at least one dye in each area is from 0.001 to 30%, particularly from 0.01 to 1.0%, by weight of the hydrophobic polymer in said material.

The material present in the calibration device of the present invention can further comprise, in one or several polymeric layers, one or several additives which can be a polymer or a small organic molecule having function to improve properties of the material, in particular mechanical properties and/or optical properties.

A second objet of the present invention is a method for manufacturing a calibration device according to the first object of the invention, comprising a step of disposing said material on said areas of the body of the calibration device.

The method can comprise a step of additive manufacturing of the body of the calibration aid.

In an embodiment, preferably when said areas receiving the material are planar, the step of disposing said material on said areas of the body of the calibration device comprises a step of printing the material on said areas.

The calibration device according to the first object of the present invention may be used for imaging an object and/or for calibrating an imaging apparatus.

Therefore, a third object of the present invention is a method for imaging an object and/or for calibrating an imaging apparatus, characterized in that it comprises a step of illuminating a calibration device according to the first object of the invention and a step of acquiring an optical signal from this calibration device.

In an embodiment, the step of acquiring the optical signal is carried out using an imaging device comprising a near-infrared camera or a multispectral or hyperspectral imaging system.

The method can also comprise a step of quantifying a distance between the imaging device and the calibration device on the basis of the acquired optical signal.

This makes it possible to standardize the optical signal.

A fourth object of the present invention is a method for analyzing an object, comprising a step of acquiring an optical signal from said object and a step of constructing an image of said object using the optical signal thus acquired, characterized in that it comprises a step of correcting this image on the basis of an optical signal acquired using a method according the third object of the present invention.

A fifth object of the present invention is the use of the calibration device according to the first object and/or the method according to the second and/or the third and/or the fourth objects in the context of surgical optical imaging applications.

For example, the method according to the third object of the present invention can be used before a surgical procedure to calibrate an optical imaging device.

The method according to the third and/or to the fourth objects of the present invention can be used during a surgical procedure so as to quantify the signal by creating ratios between the signal emitted by the calibration device and the signal emitted by any exogenous fluorophore administrated to the patient and/or the signal emitted by naturally present endogenous fluorophores in the patient.

In addition, the method according to the third and/or to the fourth objects of the present invention can be used after a surgical procedure to evaluate and quantify the signal emitted by a surgically removed specimen.

A sixth object of the present invention is a quantification method, comprising analyzing an image constructed using a method according to the fourth object of the invention and using a computer with machine and/or deep learning algorithms.

The present invention, and all its aspects, embodiments and advantages associated therewith will become more readily apparent in view of the detailed description of particular embodiments provided below, including the accompanying drawings.

BRIEF DESCRIPTION OF THE DRAWINGS

In the following, non-limiting embodiments of the invention are described with reference to the accompanying schematic drawings in which.

DETAILED DESCRIPTION

Figure 1:
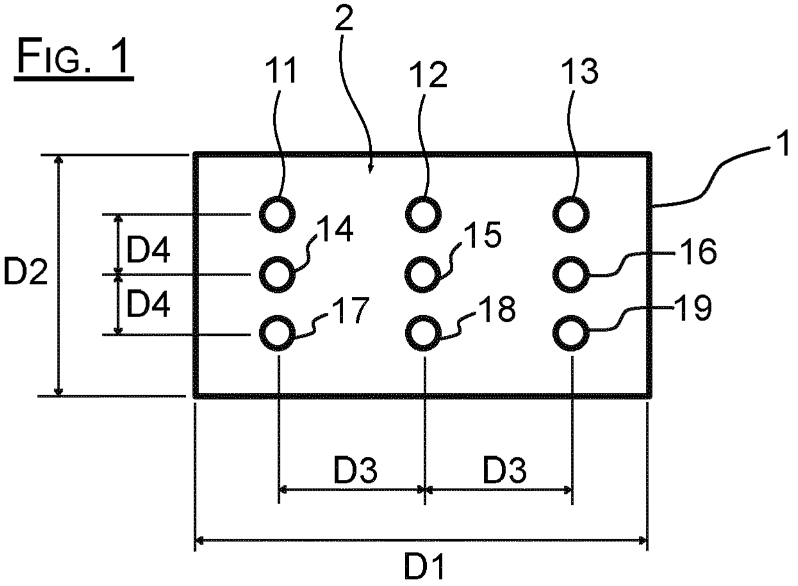
FIG. 1 illustrates a plan view of a front side of a calibration device, referred as "calibration aid", according to one embodiment of the present invention. The circles represent the cavities where an optically active polymer material is deposited.
Figure 5:
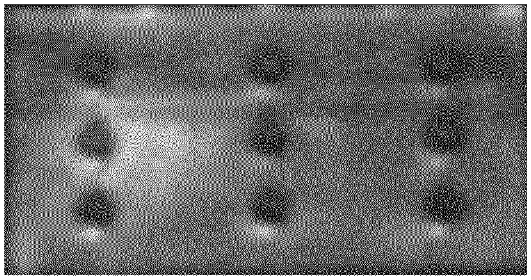
FIG. 5 shows a photograph of the front side of the calibration aid of FIG. 1.

The calibration aid depicted in FIGS. 1 and 5 comprises a body 1 of generally parallelepipedic shape.

Referring to FIG. 1, the body 1 is a rigid substrate defining a front surface 2 which is substantially planar.

In this example, said front surface 2 has a length D1 of approximately 3 cm and a width D2 of approximately 1.6 cm.

The body 1 comprises recesses or cavities forming nine wells 11-19 each extending along a direction substantially perpendicular to said front surface 2 so that each of these wells 11-19 opens to the front surface 2.

Each of the wells 11-19 is thus bounded by a respective boundary surface of the body 1 which is connected to said front surface 2 at the opening of the well.

In this example, each of the wells 11-19 has a diameter of approximately 2 mm and a depth of approximately 1.5 mm so that said boundary surface is approximately 15.7 $mm^2$, defining a total volume of approximately 4.7 $mm^3$.

Referring to FIG. 1, the wells 11-19 are arranged in three rows and three columns regularly distributed over the front surface 2.

More specifically, wells 11, 12 and 13 define a first of said rows, wells 14, 15 and 16 define a second of said rows and wells 17, 18 and 19 define a third of said rows. Wells 11, 14 and 17 define a first of said columns, wells 12, 15 and 18 define a second of said columns and wells 13, 16 and 19 define a third of said columns.

In this embodiment, each pair of adjacent columns are spaced from a distance D3 of approximately 1 cm apart, while each pair of adjacent rows are spaced from a distance D4 of approximately 0.4 cm apart.

Accordingly, the wells 11-19—and thus said boundary surfaces of the body 1—define separated areas, distinct from each other.

The body 1 can be obtained by any manufacturing process.

In this example, the body 1 is processed by additive manufacturing using a clear photopolymer resin, then washed with isopropyl alcohol under sonication for 15 minutes to get rid of the excess non-polymerized resin, then further kept under 365 nm ultraviolet light for 30 minutes for curing and, finally, washed again with isopropyl alcohol and dried under vacuum.

Of course, the body 1 may have various geometries and dimensions and wells 11-19 may be different in terms of size, number and respective arrangement without departing from the scope of the invention as defined in the appended claims.

According to the present invention, the wells 11-19 are filled with an optically active polymeric material.

The material has been prepared from a solution comprising a fluorescent dye of the following formula:

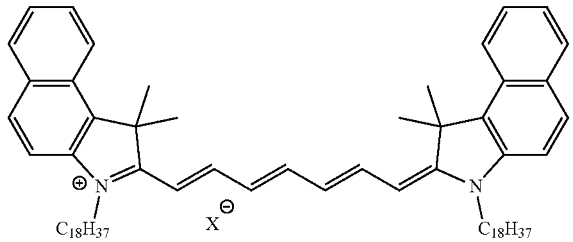

wherein $X^-$ is a bulky counterion (tetraphenylborate, or "TPB") having the following formula:

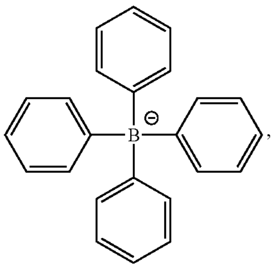,

TPB and a biocompatible polymer, e.g. poly(methylmethacrylate), (PMMA) dissolvent in acetonitrile as solvent.

In the example described above, said solution is poured into the wells 11-19 of the substrate 1 depicted in FIG. 1. In an alternative embodiment, the solution is printed onto distinct, separated areas of an external surface of a substrate forming a calibration aid.

In this example, the weight percentage of dye by weight of the hydrophobic polymer in the material, also called "dye loading" or "dye concentration", has different value in said separated areas.

In this example, dye loading was varied from 0.02 wt % to 0.5 wt % with regard to the total weight of the solution. PMMA final concentration was adjusted to 30 mg/ml for each solution.

Each well in the 3D printed calibration card was filled with 2 μl of fluorescent solution of desired concentration:

0.02% wt in wells 11, 12 and 13 of the first row, 0.1 wt % in wells 14, 15 and 16 of the second row, and 0.5 wt % in wells 17, 18 and 19 of the third row.

The cards were then left in the fume hood for 30 minutes to evaporate acetonitrile. Cards were further dried under vacuum for 30 minutes in order to further evaporate traces of acetonitrile.

The calibration aid can thus be visualized with a near-infrared imaging apparatus.

In one embodiment, said imaging apparatus comprises a 740 nm ring light-emitting diode excitation source and a near-infrared camera.

The excitation source is used to illuminate the calibration aid and the camera to acquire fluorescent signals up to said fluorescent material.

Images are preferably acquired from the camera at room temperature with 100 ms exposure time.

Figure 2:
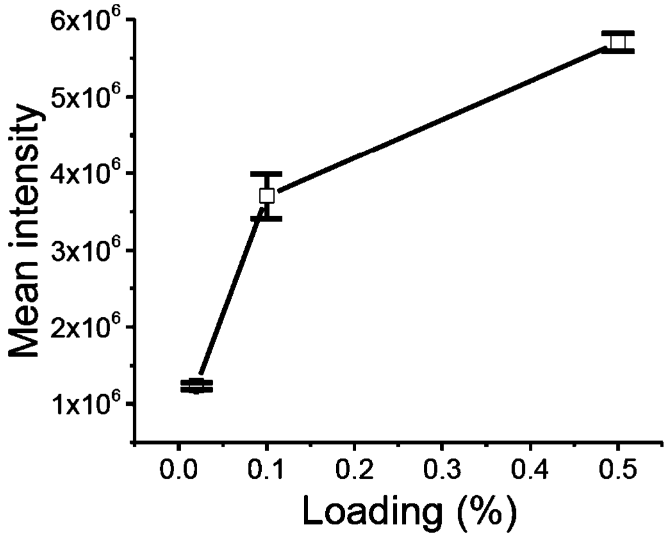
FIG. 2 shows a curve representing measured mean fluorescence intensity at different locations of the calibration aid (prepared from a transparent material) corresponding to respective dye loading with respect to the polymer in the deposited films.
Figure 6:
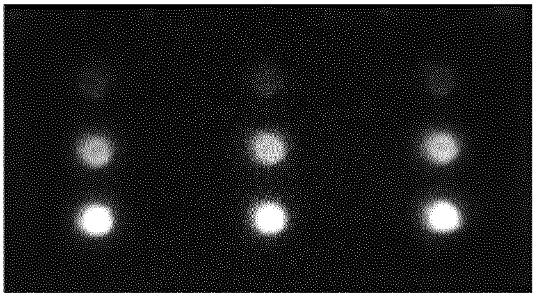
FIG. 6 shows a photograph of the front side of the calibration aid of FIG. 5 under near-infrared excitation.

Referring to FIGS. 2 and 6, analysis of images thus acquired indicates that an increase in dye loading causes an increase in the mean intensity of fluorescent signals.

In another experiment, the calibration aid was illuminated for up to three hours in order to verify the photostability of the fluorescent material.

Figure 3:
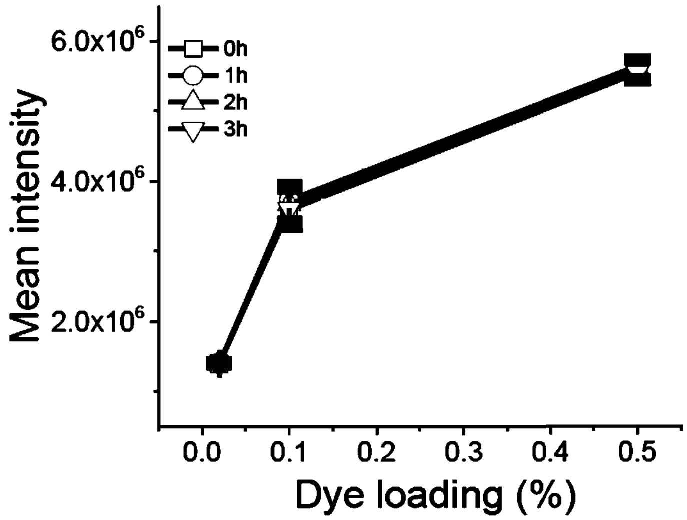
FIG. 3 shows a series of curves illustrating photostability of the calibration aid, each of said curves representing mean fluorescence intensity at different locations of the calibration aid corresponding to respective dye loading, at respective time intervals after continuous illumination from 0-3 hours.

FIG. 3 shows that there was no significant photobleaching even after three hours.

In a further experiment, said photopolymer resin used to manufacture the body 1 of calibration aid was a black resin. The same dye solutions as those described here above were used. The dye loading was 0.02 wt % in wells 14, 15 and 16 of the second row and 015 wt % in wells 17, 18 and 19 of the third row. Wells 11, 12 and 13 of the first row were filled with a solution of PMMA of 30 mg/ml in acetonitrile without dye.

As expected, no fluorescence was observed from the wells 11, 12 and 13 of the first row in images acquired with the above described imaging apparatus.

Figure 4:
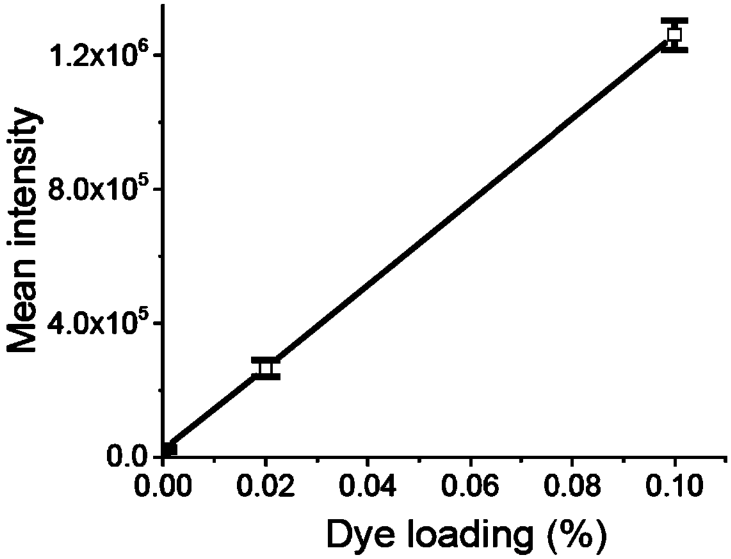
FIG. 4 shows a calibration curve representing measured mean fluorescence intensity at different locations of the calibration aid (prepared from a black material) corresponding to respective dye loading with respect to the polymer in the deposited films.

Referred to FIG. 4, image analysis indicates that a linear increase in the mean intensity of fluorescent signals from 0 to 0.1% of dye loading.

Such a curve can be used as a calibration curve to quantify the fluorescence intensity of an unknown sample.

In another embodiment, the body 1 of the calibration aid is transparent and positioned on a black surface during its illumination. The above description applies similarly to this embodiment.

The calibration aid of the invention can be used for many applications, including for example optical sensors, stimuli responsive smart materials, medical imaging and image-guided surgery.

The invention claimed is:

1. A calibration device for optical imaging applications, comprising a body forming at least two separate areas and a material arranged on said areas, wherein:

said material comprises at least one hydrophobic polymer and at least one dye visible in a spectral range of wave-lengths comprised between 500 nm and 2000 nm included;

said at least one hydrophobic polymer forms a continued matrix;

said at least one dye selected from luminescent dyes and is homogeneously distributed within said polymer matrix, in a predetermined weight percentage by weight of the hydrophobic polymer in said material; and the weight percentage of said at least one dye is different in each of said areas.

2. The calibration device according to claim 1, wherein the body comprises at least two recesses respectively forming said at least two separate areas.

3. The calibration device according to claim 1, wherein said material is in the form of a coating.

4. The calibration device according to claim 1, wherein said hydrophobic polymer is chosen from poly(methyl methacrylate), poly(ethyl methacrylate), poly(propyl methacrylate), poly(butyl methacrylate), poly(methyl methacrylate-co-methacrylic acid), poly(lactide-co-glycolide), polylactic acid, polyglycolic acid, polycaprolacton, cellulose triacetate, nitrocellulose, polydimethylsiloxane, poly(ethylene terephthalate), polycarbonate, polyethylene, ethylene vinyl acetate copolymer, polyurethane, polystyrene, and copolymers thereof with poly(ethylene glycol).

5. The calibration device according to claim 1, wherein said luminescent dyes include fluorescent dyes, phosphorescent dyes and chemiluminescent dyes.

6. The calibration device according to claim 1, wherein said at least one dye is chosen in the group comprising:

i) cyanine dyes of the following formula (I) below:

(I)

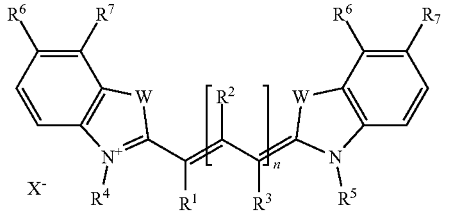

wherein:

n is an integer equal to 1, 2, 3 or 4;

$X^-$ is a counterion,

W is a heteroatom selected from the group comprising S, N and O or a carbon atom bearing two methyl substituents ($C(CH_3)_2$);

$R^1$, $R^2$ and $R^3$, which may be identical or different, represent a hydrogen atom, a hydrocarbon chain having from 1 to 24 carbon atoms;

$R^4$ and $R^5$, which may be identical or different, represent a hydrogen atom or a hydrocarbon chain having from 1 to 24 carbon atoms;

$R^6$ and $R^7$ are identical and represent a hydrogen atom, or form together and with the carbon atoms to which they are respectively bonded, a fused benzene ring, ii) a dye of following formula (II) below:

(II)

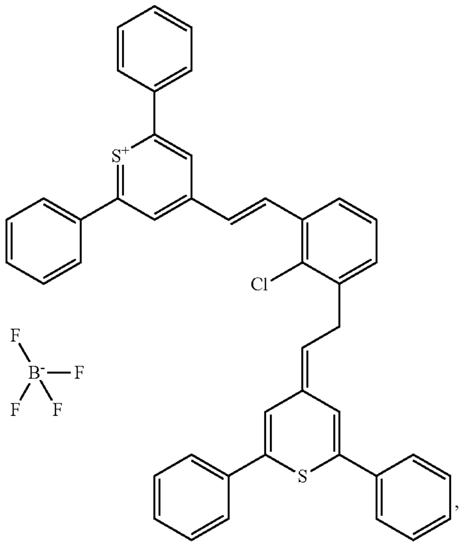

, and iii) dyes of following formula (III) below:

(III)

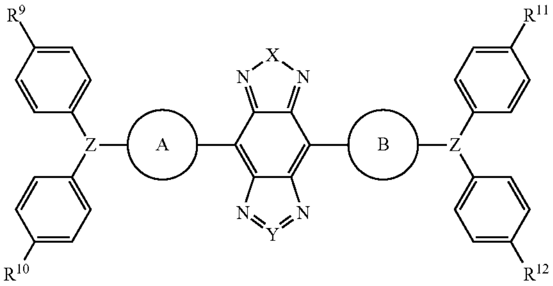

wherein:

A and B are independently selected from the group consisting of:

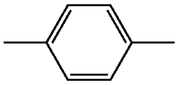

,

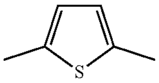

and

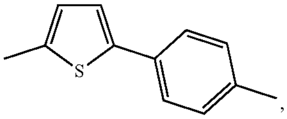

,

X and Y are each independently selected from the group consisting of S and Se,

Z is independently one of N and P; and $R^9$, $R^{10}$, $R^{11}$ and $R^{12}$ are each independently of the formula-alkyl-linker wherein "alkyl" is $—(CH_2)_n—$, further wherein n is between 1 and 14, inclusive, and further wherein "linker" is selected form the group consisting of sulfonic, phosphonic, carboxyl, hydroxyl, NETS-ester, maleimide, amine, —SH, sulfonic acid and hydrazide.

7. The calibration device according to claim 1, wherein said at least one dye is a fluorescent dye chosen among 7.5 cyanines of following formula (IV):

(IV)

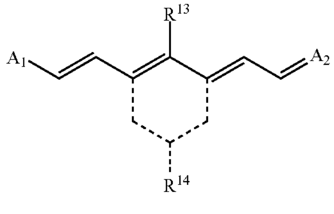

wherein:

$R^{13}$ and $R^{14}$ are the same or different and independently selected from a group consisting of:

a hydrogen, a group chosen from a $(C_1\text{-}C_{20})$alkyl, a cyclo$(C_3\text{-}C_{20})$alkyl, a $(C_2\text{-}C_{20})$alkenyl, a $(C_2\text{-}C_{20})$alkynyl, a heterocyclic group, a cyclo$(C_3\text{-}C_{20})$alkenyl, a heterocyclo$(C_2\text{-}C_{20})$alkenyl, an aryl, a heteroaryl, a hetero$(C_1\text{-}C_{20})$alkyl, a $(C_1\text{-}C_{20})$alkylaryl, and a $(C_1\text{-}C_{20})$alkylheteroaryl, said group being unsubstituted or substituted by one or two substituents chosen from a $(C_1-C_5)$alkyl, an aryl, and $-COOR_{11}$, $R_{11}$ being a $(C_1-C_{20})$alkyl, and a group of formula -(-E-$R^{15}$, wherein E is chosen from —O—, —S—, —Se—, —NH—, —$CH_2$—; $R^{15}$ is chosen from a $(C_1-C_{20})$alkyl, a cyclo$(C_3-C_{20})$alkyl, a $(C_2-C_{20})$alkenyl, a $(C_2-C_{20})$alkynyl, a heterocyclic group, a cyclo$(C_3-C_{20})$alkenyl, a heterocyclo$(C_2-C_{20})$alkenyl, an aryl, a heteroaryl, a hetero$(C_1-C_{20})$alkyl, a $(C_1-C_{20})$alkylaryl, a $(C_1-C_{20})$alkylheteroaryl, $R^{15}$ being unsubstituted or substituted by one to three substituents chosen from a $(C_1-C_5)$alkyl, an aryl, or $-COOR^{16}$, $R^{16}$ being a $(C_1-C_{20})$alkyl, $A_1$ is a group of following formula:

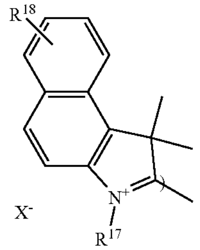

and $A_2$ is a group of following formula:

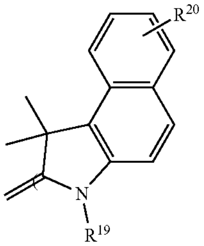

or $A_1$ is a group of following formula:

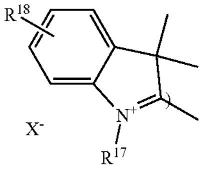

and $A_2$ is a group of following formula:

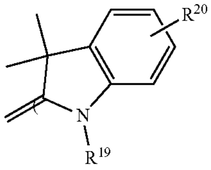

wherein:

$R^{18}$ and $R^{20}$ are independently selected from the group consisting of hydrogen, halogen, $(C_1-C_{10})$alkyl, $-OR^{21}$, $-NR^{21}R^{22}$, $-NO_2$, $-CF_3$, —CN, —S $R^{21}$, $-N_3$, —C(=O) $R^{21}$, —OC(=)O$R^{21}$, —C(=O) $NR^{21}R^{22}$, $-NR^{21}C(=O)$ $R^{22}$, wherein $R^{21}$ and $R^{22}$ are independently selected from hydrogen, unsubstituted $(C_1-C_{10})$alkyl, unsubstituted $(C_2-C_{10})$alkenyl, unsubstituted $(C_2-C_{10})$alkynyl, cyclo $(C_3-C_{10})$alkyl, heterocyclic group, cyclo$(C_3-C_{10})$ alkenyl, heterocyclo$(C_2-C_{10})$alkenyl, aryl, heteroaryl, aryl$(C_1-C_{10})$alkyl, hetero$(C_1-C_{10})$alkyl, $(C_1-C_{10})$alkylaryl, $(C_1-C_{10})$alkylheteroaryl;

$R^{17}$ and $R^{19}$ are independently selected from the group consisting of a $(C_1-C_{20})$alkyl eventually substituted by a hydrophobic group, a cyclo$(C_3-C_{20})$alkyl eventually substituted by a hydrophobic group, a $(C_2-C_{20})$alkenyl eventually substituted by a hydrophobic group, a $(C_2-C_{20})$alkynyl, a heterocyclic group eventually substituted by a hydrophobic group, a cyclo $(C_3-C_{20})$alkenyl eventually substituted by a hydrophobic group, a heterocyclo$(C_2-C_{20})$alkenyl eventually substituted by a hydrophobic group, an aryl eventually substituted by a hydrophobic group, a heteroaryl eventually substituted by a hydrophobic group, a hetero$(C_1-C_{20})$alkyl eventually substituted by a hydrophobic group, a $(C_1-C_{20})$alkylaryl eventually substituted by a hydrophobic group, a $(C_1-C_{20})$alkylheteroaryl eventually substituted by a hydrophobic group, said hydrophobic group being selected from methyl, ethyl, methoxy, ethyloxy;

$X^-$ is a counterion, and their analogues.

8. The calibration device according to claim 7, wherein said at least one dye of formula (I) is a fluorescent dye and is a 5.5, cyanine of following formula:

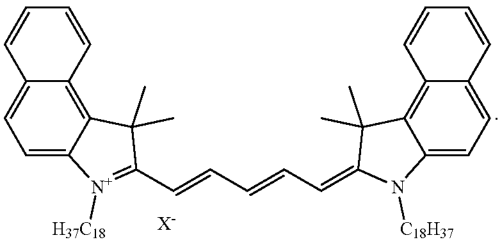

9. The calibration device according to claim 5, wherein the counterion $X^-$ is chosen from:

an inorganic counterion, an organic counterion, or a bulky organic counterion chosen from tetraphenylborate, tetrakis(pentafluorophenyl) borate, tetrakis(4-fluorophenyl) borate, tetraphenylborate, tetrakis[3,5-bis-(trifluoromethyl)phenyl]borate, tetrakis[3,5-bis-(1,1,1,3,3,3-hexafluoro-2-methoxy-2-propyl)phenyl] borate and tetrakis[perfluoro-tert-butoxy]aluminate.

10. The calibration device according to claim 1, wherein the weight percentage of the at least one dye in each area is from 0.001 to 30% by weight of the hydrophobic polymer in said material.

11. A method for manufacturing a calibration device according to claim 1, comprising a step of disposing said material on said areas of the body of the calibration device.

12. A method for imaging an object and/or for calibrating an imaging apparatus, characterized in that it comprises a step of illuminating a calibration device according to claim 1 and a step of acquiring an optical signal from this calibration device.

13. The method according to claim 12, wherein the step of acquiring the optical signal is carried out using an imaging device comprising a near-infrared camera or a multispectral or hyperspectral imaging system.

14. The method according to claim 13, comprising a step of quantifying a distance between the imaging device and the calibration device on the basis of the acquired optical signal.

15. A method for analyzing an object, comprising a step of acquiring an optical signal from said object and a step of constructing an image of said object using the optical signal thus acquired, characterized in that it comprises a step of correcting this image on the basis of an optical signal acquired using a method according to claim 12.

* * * * *